Nov. 26, 1935.   M. H. TRASK   2,022,328
BRAKE SHOE
Filed Nov. 20, 1933   3 Sheets-Sheet 1
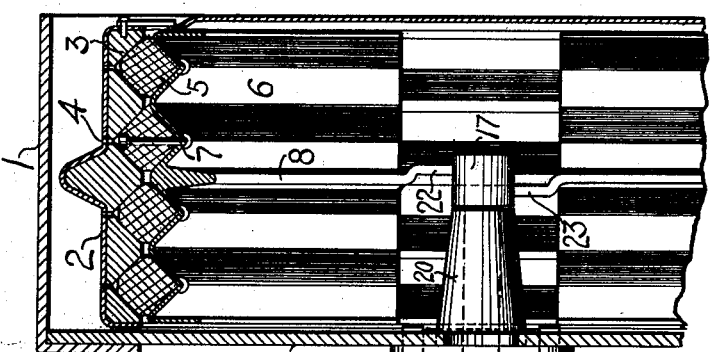
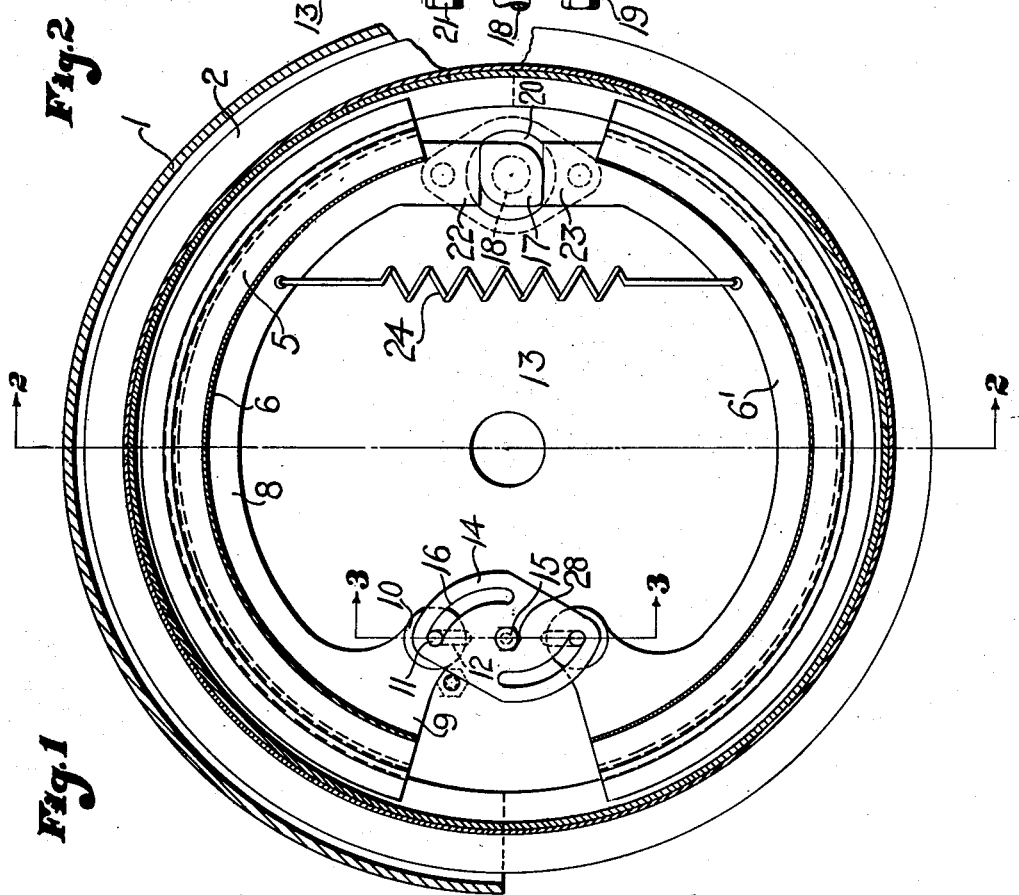
Merrill H. Trask
INVENTOR
BY Samuel H. Davis
ATTORNEY Nov. 26, 1935.  M. H. TRASK  2,022,328
BRAKE SHOE
Filed Nov. 20, 1933  3 Sheets-Sheet 2

Merrill H. Trask
INVENTOR

BY Samuel H. Davis
ATTORNEY

Nov. 26, 1935.   M. H. TRASK   2,022,328
BRAKE SHOE
Filed Nov. 20, 1933   3 Sheets-Sheet 3
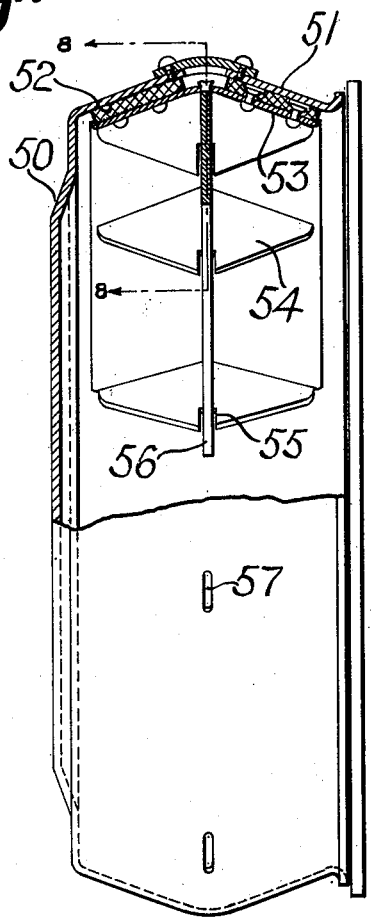
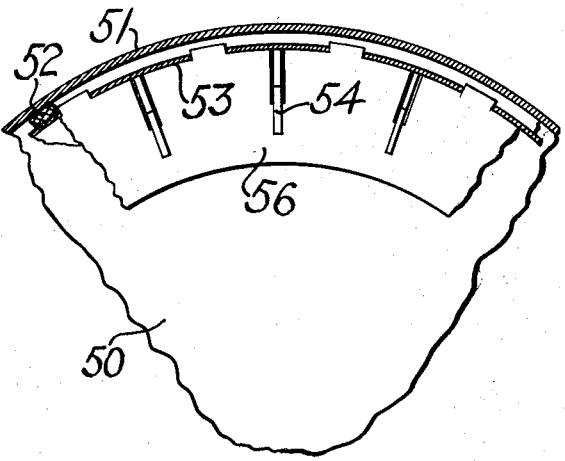
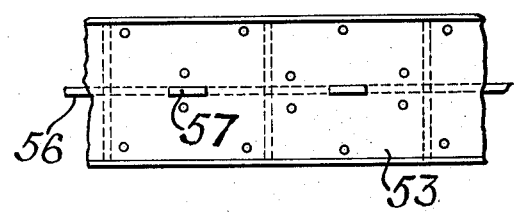
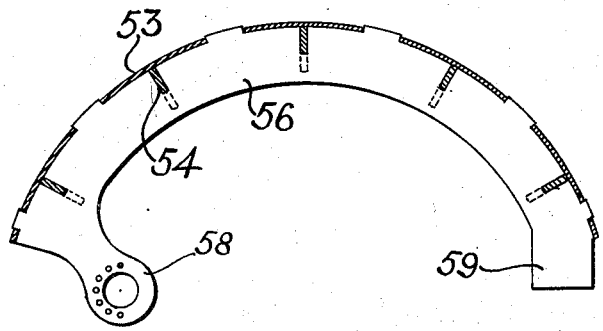
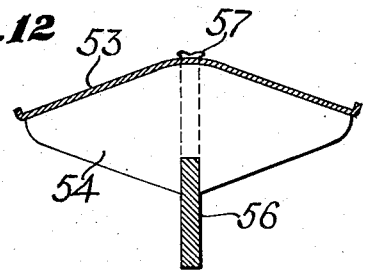
Merrill H. Trask
INVENTOR
BY Samuel H. Davis
ATTORNEY Patented Nov. 26, 1935

2,022,328

UNITED STATES PATENT OFFICE 2,022,328

BRAKE SHOE

Merrill H. Trask, Lansing, Mich., assignor of one-third to Gordon H. Van Burger and one-third to Harry J. Aldrich, both of Lansing, Mich.

Application November 20, 1933, Serial No. 698,916

3 Claims. (Cl. 188—250)

This invention relates to safety braking mechanisms for vehicles, and especially for motor cars, and has for its object the combination of parts of special construction and arrangement as described herein, believed to attain in a superior manner and with particularly effective and durable structure, the objects which may be stated as below set forth.

This invention is thought to afford more braking area in a given, or limited amount of space.

By this invention it is found that the braking heat is distributed over a number of brake linings and brake band surfaces, thus relieving the drum from heat distortion due to the excessive braking heat at high road speeds or under heavy load braking conditions.

This invention attains a slight sliding action between braking surfaces and brake linings at the exact moment of contact, thus preventing lines or scores in or on the drum braking surfaces due to continued braking contacts between brake linings and braking surfaces of the housings and brake drums.

By the employment of this invention there results more brake pounds per square inch of braking surface, with less pressure or force applied to the brake shoes, pedals, levers, or other sources of applied power, due to the fact that angular or curved braking surfaces have a wedge braking action.

This invention also enables more brake pounds to be applied to the braking surfaces of the drum with less actual direct pounds pressure on the brake linings, due to the angular braking effect and the division of lines of force as applied to the shoe and transferred to the braking surfaces at opposite angles.

The above and other objects and advantages are considered to follow from the use of this invention constructed and arranged as described in this specification and illustrated in the accompanying drawings.

Fig. 1 is a vertical section of a brake housing, drum and shoes formed in accordance with ths invention, showing the disposition of all parts as assembled.

Fig. 2 is a cross section of the upper part of the assembly in Fig. 1, showing the angular braking surfaces.

Fig. 7 shows a brake drum partly in section and of further modified construction of the drum and brake rotor in the drum provided with brake band material and angular surfaces.

Fig. 8 is a sectional view of the parts shown in Fig. 7, taken on the broken line 8—8 of Fig. 7.

Fig. 9 is a perspective view of one of the brake wheel cross ribs used in the modification illustrated in Fig. 7.

Fig. 10 is a view from the exterior of the brake drum, showing a portion only thereof.

Fig. 11 is a sectional view taken lengthwise of one of the brake shoes as shown in Fig. 7.

Fig. 12 illustrates the connection as made between the brake shoe cross rib and the shoe in accordance with the modification illustrated in Fig. 7.

Throughout the drawings and description the same number is used to refer to the same part.

Figure 3:
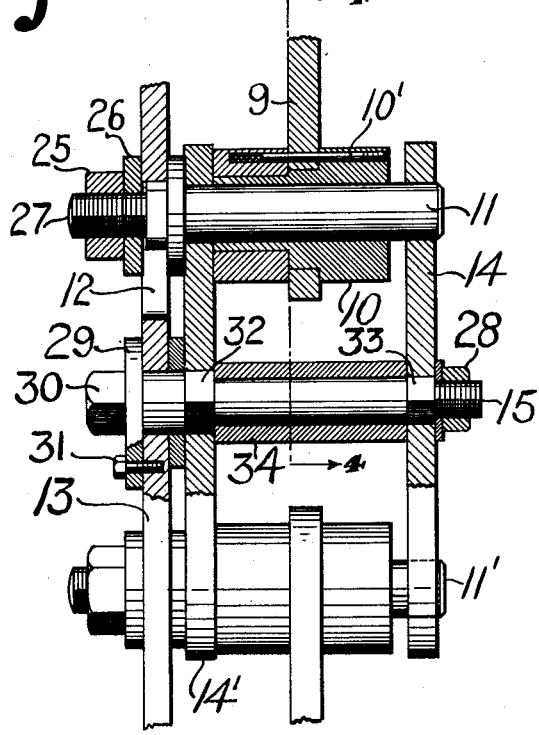
Fig. 3 is an enlarged partly sectional view, showing the pivoted ends of the brake shoes in combination with the adjustable cams borne by the shoes, and the adjustable cam plate with the eccentric slots occupied by the pivot pins of the shoes, and the securing means for the various members.
Figure 4:
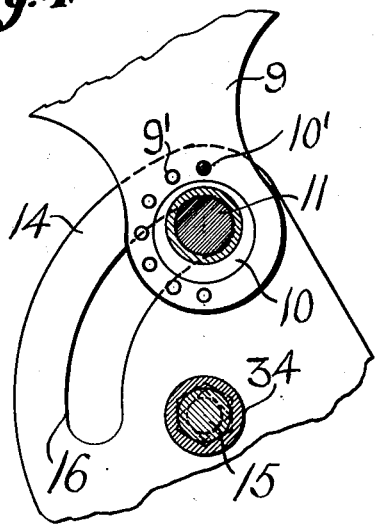
Fig. 4 shows somewhat enlarged the cam plate which has the eccentric slots, and also the adjustable cams borne by the pivot pins of the shoes. This view is taken along the broken line 4—4 of Fig. 3.

Considering Figs. 1, 2, 3 and 4, in a housing 1 of any chosen form is located a brake drum 2 which may be attached to the wheel not shown of a motor car. A plurality of lining strips 3 of angular cross section are provided within the drum, and air holes 4 are made through the drum to permit air to enter and escape. Rectangular brake band strips 5 are secured upon the brake shoes 6 by rivets 7, and the brake shoe has a mid rib 8 internally. There is a second and identical brake shoe 6', and both shoes have pivoted end portions formed with extensions 9 carrying adjustable cams 10 on pivot pins 11. The cams 10 are adjustable upon the pins 11 and secured to the ends 9 of the shoes by the engagement of the holes 9' in the shoes and the cam securing pins 10', as best illustrated in Fig. 4.

In Fig. 1 will be noted the aligned slots 12 in the housing back plate 13, and the pivot pins 11 adjustably engage those slots and are also engaged by the cam plate 14 carried by its center pin 15 and having two eccentric slots 16 which take the pins 11 as shown. The parts just described set out the devices for adjusting the pivoted ends of the brake shoes towards or from each other. There may be a second cam plate 14' identical with its fellow 14.

The free ends of the brake shoes are forcibly separated to effect the braking action by means of the cam 17 on cam shaft 18, best shown in Fig. 2, passing through the flange 19 of a conical boss 20, the flange being secured by screws 21 to the housing back plate 13. The free ends 22 and 23 of the shoes are contiguously located with respect to the cam 17, and when the cam is turned the ends are separated and the brake applied. An opposite movement of the cam permits the spring 24 attached to the shoes to return them into their original postures. Shoe ends 22 and 23 are usually square ends with flat faces. As best shown in Fig. 3, the pivot pins 11 and 11' are secured removably in slots 12 by means of nuts 25 on washers 26 engaging the screw termination 27 of the pins. The pin 15 at the center of the cam plate 14 has a nut 28 on the plate, and a washer 29 upon the rear of the back plate 13 of the housing against which is a nut 30, and the washer is secured against turning by a set screw 31 let into the back plate 13. It will be likewise observed in Fig. 3 that the center pin 15 of the cam plate 14 has the squared portions 32 and 33 in engagement with the cam plates. The plates cannot, therefore, turn on pin 15 whatsoever force is applied to the brake members. The cam plates are spaced by means of the sleeve 34 on pin 15.

Figure 5:
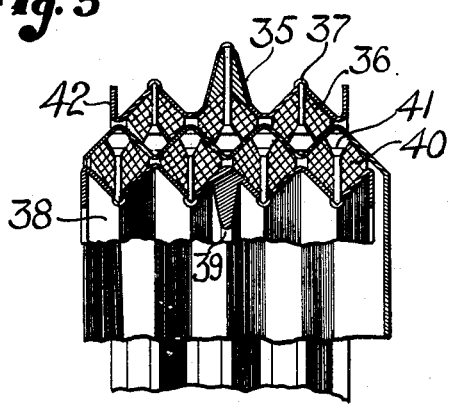
Fig. 5 is a cross section of the upper portion of a slightly modified form of this invention with the angular brake linings.

Considering Fig. 5, which is a slight modification, the drum 35 has a unique shape, and the rectangular brake lining 36 is held therein by rivets 37. The shoes 38 have the usual mid rib 39 interiorly, with rectangular brake band material 40 held in place by rivets 41. It will be noted that the drum 35 has flanges 42, for strengthening purposes and to fit certain wheel formations.

Figure 6:
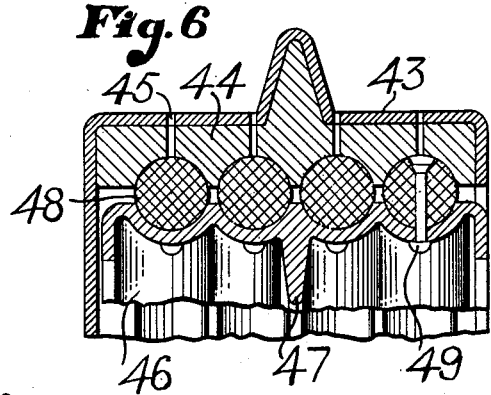
Fig. 6 represents a cross section of the upper portion of a brake drum and brake, showing a modified form of brake surfaces contemplated by this invention.

Considering Fig. 6, drum 43 has angular lining strips 44, and air holes 45. The shoe 46 has the mid rib 47, and round strips of brake band material 48 seated in corresponding grooves in the periphery of the shoe, and held therein by rivets 49.

Considering Fig. 7, the drum 50 is given an angular periphery 51, and the shoe rim is angular to fit the interior of the drum and has the bands of brake material 52 riveted thereon. The shoe rim is marked 53, and is best shown in Fig. 12. Supporting the shoe rim are spaced angular ribs 54, each of which has a slot 55 which engages the mid rib 56 of the shoe. It will be noted in Fig. 11 that the shoe is substantially of the same form as illustrated in Fig. 1 of this description. As usually made the shoe ring or rim has spaced lugs 57, and these are passed through suitable orifices in the periphery of the shoe and headed on the exterior as shown in Fig. 12 to hold the whole in place. The ends of the shoe 58 and 59 are of the same pattern as the ends 9 and 22 of the shoe shown in the figures first described.

In the operation, the brake is applied by the cam 17 as stated, and the angular brake surfaces distribute the braking effect over a larger area, and result in a greater braking effect by the exertion of a given force. If the brake materials of the drum lining and brake bands become worn or compressed, the cams carried at the pivoted ends of the shoes are suitably adjusted to take up for the wear or compression. The operation is the same in the preferred form and in the modified forms.

Having now described this invention and the manner of its use, I claim:—

1. In a brake mechanism, the combination with a brake shoe rim of arcuate form having a middle rib, and a series of transverse ribs or plates in engagement with the said rim and middle rib, the said rim being convex outwardly, and brake bands secured upon opposite sides of said rim externally.

2. In a brake mechanism, the combination with a brake shoe rim of arcuate form provided with a middle rib, the said rib having a series of spaced lugs, the said lugs being passed through said rim and headed externally thereupon, the said rim being convex outwardly and concave inwardly as shown, a series of plate ribs arranged in engagement with the said rim and middle rib, and brake bands secured upon opposite sides of the said rim externally.

3. In a brake mechanism, the combination with a brake shoe rim of arcuate form having a middle rib, the said rim being angularly convex outwardly and concave inwardly, the said rib being secured to the rim interiorly along the middle line lengthwise of the rim, a series of plate ribs spaced apart and passing transversely through the said middle rib, each of said transverse ribs being provided with a slot arranged in engagement with the said middle rib, and separate brake bands secured upon opposite sides of said rim externally.

MERRILL H. TRASK.